United States Patent [19]

Wentzel et al.

[11] 4,282,553
[45] Aug. 4, 1981

[54] METHOD FOR GENERATING DIGITAL ACTUAL VELOCITY SIGNALS

[75] Inventors: Peter Wentzel, Augsburg; Hermann Eiting, Unterpfaffenhofen, both of Fed. Rep. of Germany

[73] Assignee: Siemens Aktiengesellschaft, Berlin & Munich, Fed. Rep. of Germany

[21] Appl. No.: 60,374

[22] Filed: Jul. 25, 1979

[30] Foreign Application Priority Data

Jul. 31, 1978 [DE] Fed. Rep. of Germany ....... 2833591

[51] Int. Cl.³ .............................................. G11B 21/02
[52] U.S. Cl. ......................................... 360/75; 360/53
[58] Field of Search ...................... 360/75, 77, 69–70, 360/31, 97–99, 50, 53

[56] References Cited

U.S. PATENT DOCUMENTS

| | | | |
|---|---|---|---|
| 3,511,151 | 5/1970 | Hillman | 360/31 X |
| 3,820,712 | 6/1974 | Oswald | 235/151.32 |

*Primary Examiner*—John H. Wolff
*Attorney, Agent, or Firm*—Hill, Van Santen, Steadman, Chiara & Simpson

[57] ABSTRACT

A method for generating digital actual velocity signals in a positioning system for the write/read heads of a magnetic disk storage utilizes a position signal received from a servo-head to derive digital signals having edges marking the data track centers. Reset signals for a digital counter counted up by clock pulses are formed from the digital position signals and, upon recognition of a zero passage of the position signal, the content of the counter is sampled and the counter is reset. The position signal is then compared with a stored optimum deceleration curve and a coil is operated through a series of gates to appropriately position the write/read heads.

10 Claims, 2 Drawing Figures

METHOD FOR GENERATING DIGITAL ACTUAL VELOCITY SIGNALS

BACKGROUND OF THE INVENTION

1. Field of the Invention

The present invention relates to a method for generating digital actual velocity signals in a positioning system for the write/read heads of a magnetic disk storage, and in particular such a method in which a position signal for the precise regulation is obtained from servo information.

2. Description of the Prior Art

Positioning systems know in the art for disk storages generally have electric linear motors as the positioning drive. Such systems substantially without exception utilize a time optimal control of the track acess, meaning that the positioner is first accelerated with the full driving foce available, and is the decelerated or braked.

In such a time optimal control positioning system, the velocity must be determined according to a root function from the target distance. In conventional positioning controls, this is achieved by converting the content of a track difference register, having a current reading presenting the distance to the target track, into an analog path signal and subsequently smoothing that signa. The smoothing of the path curve is achieved by integrating the velocity signal between two successive cylinder pulses and the small path triangles that arise as a result threrof are then subtracted from the stepped path curve at the D/A converter output. The smoothed path curve is then adjusted by a root function generator to finally achieve the rated velocity curve, and is then compared at the input of asumming amplifier with the analog actual velocity signal supplied by an inductive or electronic velocity generator. The summing amplifier amplifies the difference between rated and actual velocity signals and thereby controls a power amplifier for producing an appropriate positioning current to a coil. The power amplifier is generally a linear amplifier, i.e., the coil current will be proportional to the repetitive error in the area that is not current limited.

Other approaches utilizing switching amplifiers are also known in the art. In such methods, the delay current is pulsed (two-position control) whereby the frequency of the deceleration pulses amounts only to a few kilohertz in order to avoid instability in the system. The change of the correcting variable is achieved by means of phase modulation of the deceleration pulses. An analog comparison of the repetitive error with a saw-tooth voltage is undertaken to achieve the correction. This method has the advantage in allowing for the use of a power amplifier of a simplier design however, the use of phase modulation is more complex than the linear system, so that the overall system is not substantially simplified.

Both of the above-described linear and non-linear systems utilizes inductive or electronic generators in connection with extensive analog devices. The use of such velocity generators is the chief disadvantage of such systems because inductive velocity generators tend toward resonances and, at lower velocities, are imprecise because of coupling of the positioning coil current into the generator coil. Electronic velocity generators require a large circuit outlay and must, moreover, be adapted to the respective device parameters because such generators only undertake an indirect velocity measurement. The analog devices in the control electronics are expensive, difficult to test, and require extensive auxiliary circuits for such testing and diagnosis.

One attempt to overcome these problems, i.e., to reduce the analog portion of the control electronics, is a system in which an optimum deceleration curve for the positioner is stored in digital form and is compared by a comparator with a signal which is proportional to the actual velocity of the positioner and a digital control signal for the positioner is derived from this comparison. Although the analog portion of the control electronics can be significantly reduced with devices of this type, the difficulties of the analog velocity generators usually employed in positioners for magnetic disk storages still remain.

SUMMARY OF THE INVENTION

It is an object of the present invention to provide a method for generating a digital actual velocity signal in a positioning system for the write/read heads of a magnetic disk storage in which position signals for the precise regulation thereof are gained from servo information.

This object is achieved by deriving the digital signals from a position signal so that the edges of the digital signals mark the centers of the data tracks, and also deriving reset signals for a digital counter from those same digital signals. Upon recognition of a zero passage of the position signal, the content of the counter is sampled and the counter is reset. This method has the advantage that devices for controlling the velocity of a positioner for the write/read head of a magnetic disk storage can function completely digitally, so that no analog devices or circuitry are needed. Not only are the signals for the rated velocity generated digitally, and in particular those for the deceleration curve of the positioner system, but also the measurements of the actual velocity and the generation of corresponding actual velocity signals are carried out digitally.

DESCRIPTION OF THE PREFERRED EMBODIMENTS

Figure 1:
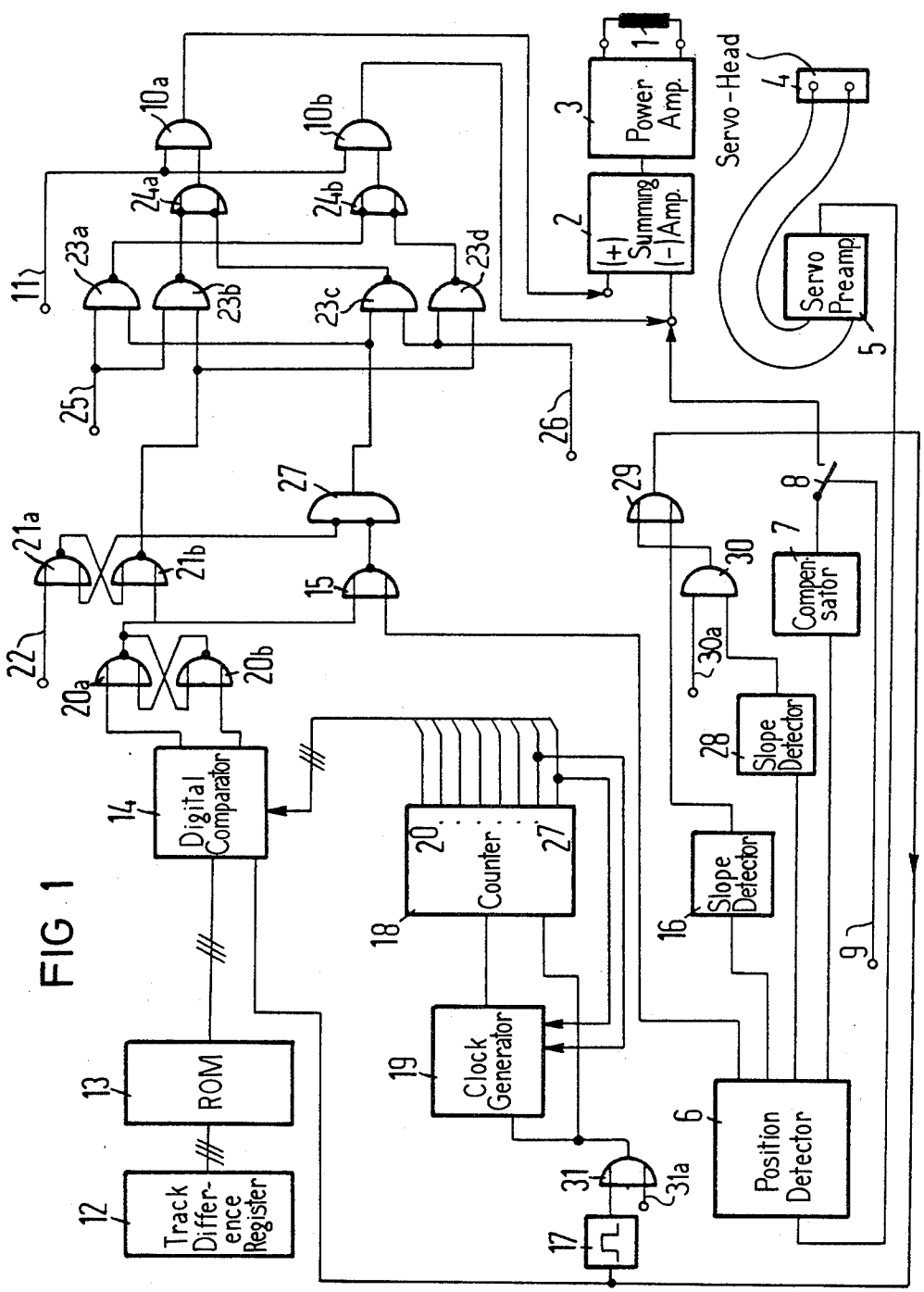
FIG. 1 is a schematic diagram of a completely digital system for generating digital actual velocity signals in a positioning system constructed in accordance with the principles of the present invention.

A schematic diagram representing a completely digital positioner system for positioning the write/read heads of magnetic disk storage is shown in FIG. 1, generally consisting of a fine control circuit and a coarse control circuit which act in concert to drive a positioner 1. The positioner 1 may consist of a coil or any other suitable device as is known in the art. The positioner 1 is controlled by a summing amplifier 2 and driven by a power amplifier 3. The inputs to the summing amplifier 2 are derived as follows.

A servo-head 4 and servo-preamp 5, constructed as is known in the art to receive signals from a separate servo disk (not shown) provide position signals to a position detector 6. The position detector 6 provides a signal which is supplied to the negative input of the summing amplifier 2 via a compensator 7 and a switch 8. The switch 8 is opened or closed by the presence or absence of a signal on line 9, which corresponds to a signal on line 11 which enables or disables the coarse control circuit of the positioner system through AND gates 10a and 10b. The signals on lines 9 and 11 can be generated in any suitable manner, such as by a control program. The position detector 6 also provides so called cylinder pulses to an OR gate 15 in the conventional manner.

The coarse control portion of the system contains a track difference register 12 connected to a memory 13 for storing digital values of an optimum retardation curve for the positioning system as is known in the art. The memory device 13 may be a read only memory or a random access memory. The signals supplied from the memory 13 are compared in a comparator 14 with actual velocity signals, generated as described below, which supplies an appropriate signal to the summing amplifier 2, as also described below, depending upon whether the actual velocity is greater or smaller that the rated velocity.

The inventive concept herein which allows the positioning to be achieved completely digitally relates to the manner in which the actual velocity of the positioner 1 is determined and appropriate input signals to the comparator 14 are generated. The basis for the velocity measurement is the position signal, graphically shown at axis A in FIG. 2, which is employed for the cylinder counting and for the precise regulation. The position signal shows a zero passage for each data cylinder and proceeds in the area of the cylinder centers in a manner proportional to the path. The present invention utilizes digital signals whose edges mark the data track (cylinder) centers which are derived from the position signal supplied by the position detector 6.

In the embodiment shown in FIG. 1, a zero passage (or slope) detector 16 serves that end. The detector 16 receives the signal shown on axis A, and generates therefrom the signal shown on axis B of FIG. 2. The output of the slope detector 16 serves as one input to an AND gate 29, the other input of which is also derived from the position detector 6, in a manner more fully described below.

Figure 2:
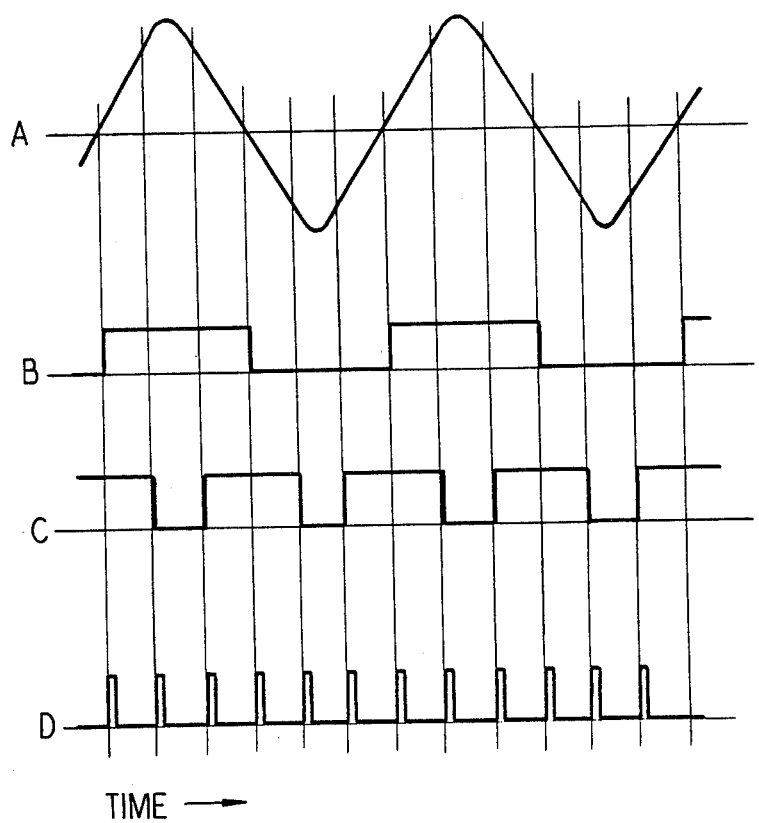
FIG. 2 is a graphic representation of signals occurring at various parts of the circuit of FIG. 1.

The output of the AND gate 29 serves an input to an edge detector 17 including a post-connected monostable multivibrator which generates reset signals as shown on axis D in FIG. 2. The output of the edge dectector 17 supplies a counter 18 and a clock generator 19 via an AND gate 31, whose purpose will be described below. The clock generator 19 provides clock pulses to the counter 18. The number of clock pulses counted by the counter 18 between 20 passages, and thus, between two data cylinder centers, is a measure of the velocity of the positioner 1. As soon as a new zero passage of the position signal is recognized, a digital comparator 14 compares the content of the counter 18 with the content of the memory 13, thereby in effect comparing the actual velocity of the positioner 1 with its rated velocity. The rated velocity curve is stored in the form of digital counter readings in the memory 13, for example, in the form of a ROM.

If the content of the counter 18 is smaller than the corresponding value of the memory 13, this means that the positioner is operating too fast. If the content of the counter 18 is greater than the corresponding value of the memory 13, the positioner is operating too slow with respect to the desired velocity. This information, in the form of a digital signal at the output of the comparator 14, is retained by a latch consisting of interconnected AND gates 20a and 20b until the next comparison time, i.e., until the next occurence of a zero passage signal.

In efficient disk storage devices, the velocity regulation for the positioner system must govern a range from approximately 0.04 m/s through 1.5 m/s. If, for example, 40 pulses per track are assumed for the maximum velocity, then 1500 pulses are assumed for the minimum velocity. Accordingly, the counter 18 and the memory 13 would have to be able to generate 11 digits in order to represent this value in the binary system. In order to utilize counters and memories having a lower number of memory and output positions, a variable frequency division for the counting pulse is provided so that the variable division relationship can be derived from either the content of the counter 18 itself or from the content of the track difference register 12. It is then possible, for example, to utilize an eight-place counter. This is represented in FIG. 1 by means of the two connection lines from the most significant positions of the counter 18 to the clock generator 19.

The gates 20a and 20b at the output of a comparator 14 control a second latch consisting of AND gates 21a and 21b, which divide the entire positioning process into an acceleration section and a deceleration section. During the acceleration phase, as in known systems, a constant current flows so that the gate 21a is set by a signal on the line 22 at the beginning of a positioning process. One output of the latch comprised of the gates 21a and 21b serves as one input to another latch comprised of AND gates 23a and 23b, which is enabled when a signal appears on the line 25 to control the positioner 1 in the forward direction. The output of the latch formed by the gates 21a and 21b also serves as an input to another latch comprises of AND gates 23c and 23d, which controls the positioner in the reverse direction when enabled when a signal appearing on the line 26. The latches comprised of the gates 23a and 23b, and comprised of the gates 23c and 23d, are connected to another latch comprised of AND gates 24a and 24b which in turn control the gates 10a and 10b in conjunction with the signal received on line 11 as previous discussed.

The deceleration phase is recognized by means of an initial change in the rated velocity. In such a case, the latch consisting of the gates 21a and 21b is reset and the drive of the positioner 1 ensues in a corresponding manner via the gates 15 and 27, as well as the latches described above. Deceleration pulses are constantly generated from the cylinder pulses supplied by the position detector 6, and with the assistance of the gate 15, the stored comparison result of the digital comparator 14 as processed by the gates 20a and 20b, is superimposed. This means that additional deceleration current flows to the positioner 1 as long as the gates 20a and 20b at the output of the comparator 14 have stored the information that the content of the counter 18 is smaller than the content of the memory 13.

A potential problem which may arise upon employment of the above system centers around the occurrence of very small track differences. Information concerning the velocity of the positioner only exists in the track centers, and this information contains only the average which the system had upon traversing the preceding segment. The average velocity, however, is inaccurate as far as providing information relating to the ultimate velocity, to an extent which is proportional to the magnitude of the possible relative velocity change in the area of the measuring segment. If is therefore desirable to shorten the measuring sections in the areas of large relative velocity changes, i.e., given small cylinder differences. This can be achieved by the inventive process disclosed herein because of the particular type of digital signals derived from the position signal.

Additional digital signals are derived from the position signal received from the servo preamplifier 5 and generated by the position detector 6 by means of a slope detector 28 connected thereto. The slope detector 28 provides the signal shown on axis C in FIG. 2 which has edges leading and lagging the track center by ⅓ of a track interval. The position error signal in the area of the cylinder centers has a curve proportional to the path through approximately ⅔ of the track division, as shown in FIG. 2.

The edge detector 17 can derive reset signals for the counter 18 both from the first signals marking the track centers as well as from the additional signals respectively marking ⅓ of the track division leading and lagging the track center because the outputs of the two slope detectors 16 and 28 are joined in an AND gate 29. An additional AND gate 30, connected between the slope detector 28 and one input of the gate 29, allows pulses produced by the detector 28 to be effective only in the range of very small cylinder differences, with selective "tuning" enabled by adjustment of the input on line 30a.

The gate 31 at the output of the edge detector 17 also allows adjustment of the output of a edge detector 17 to produce a defined initial state for the counter 18 and the clock generator 19 for a subsequent positioning process.

The output frequency of the clock 19 may also be varied, and in particular may be varied as a function of the contents of the counter 18 or the contents of the track difference register 12.

Although the inventive concept herein has been explained on the basis of FIG. 1 constructed in the form of discrete components, it is also possible to realize the invention method by the use of programmed logics, such as those employed in microprocessors.

Although modifications and changes may be suggested by those skilled in the art it is the intention of the inventors embody within the patent warranted hereon all changes and modifications as reasonably and properly come within the scope of their contribution to the art.

We claim as our invention:

1. A method for generating digital signals representing the actual velocity of a disk storage having a plurality of data tracks thereon, each said data track having a data track center; for positioning write/read heads associated with the disk storage, said method comprising the steps of:
    monitoring the disk position;
    providing an electronic position signal corresponding to the disk position by means of a servo-head and a servo-amplifier, said position signal having a plurality of zero passages through a time axis each corresponding to a data track center;
    converting said position signal to a series of first pulse signals each having a leading edge and a lagging edge respectively corresponding to successive data track centers;
    simultaneously converting said position signal to a series of reset pulses corresponding to each said zero passage for operating a clock and a binary counter connected thereto;
    supplying said series of first pulse signals to said counter;
    periodically sampling said counter for obtaining a count of said series of first pulse signals therefrom representing said actual velocity; and
    resetting said counter upon each occurrence of a zero passage.

2. The method of claim 1 wherein each said data track has a track interval defined by a distance between successive data track centers and including the additional steps of:
    converting said position signal to a series of second pulse signals each pulse of which is centered on a data track center and has leading and lagging edges each representing ⅓ of a track interval leading and lagging the track center;
    combining said first pulse signals and said second pulse signals in and AND gate having an output; and
    using said output to form said series of reset signals.

3. The method of claim 2 wherein the step of converting said position signal to a series of reset signals consists of using an edge detector to generate a reset pulse upon recognition of an edge of said output signal from said AND gate representing said combined first and second pulse signals.

4. The method of claim 1 wherein the step of converting said position signal to a series of first pulse signals comprises using a zero passage detector which changes its output state upon recognition of a zero passage in said position signal.

5. The method of claim 1 wherein the step of converting said position signals to a series of reset signals consists of using an edge detector to generate a reset pulse upon the recognition of an edge of said first pulse signal.

6. The method of claim 1 wherein said counter has an output and wherein a rated velocity signal is stored in a memory having an output, and including the additional steps of:
    comparing said output of said memory with said output of said counter using a digital comparator;
    generating a third pulse signal corresponding to whether said counter output is greater than or less than said memory output; and
    storing said third pulse signal until a next sampling period.

7. The method of claim 6 including the step of storing said rated velocity signals in a read only memory.

8. The method of claim 6 wherein said rated velocity signal is generated by a track difference register and including the additional step of varying the frequency of said clock as a function of the content of said track difference register.

9. The method of claim 6 including the step of storing said rated velocity signals in a random access memory.

10. The method of claim 1 including the additional step varying the frequency of said clock as a function of the content of said counter.

* * * * *